United States Patent
Bar-El et al.

(10) Patent No.: US 10,592,673 B2
(45) Date of Patent: Mar. 17, 2020

(54) SYSTEM, DEVICE, AND METHOD OF MANAGING TRUSTWORTHINESS OF ELECTRONIC DEVICES

(71) Applicant: ARM LIMITED, Cambridge (GB)

(72) Inventors: Hagai Bar-El, Rehovot (IL); Leonid Dorrendorf, Maale Adumim (IL); Avraham Moshe Schneider, Kiryat Yam (IL)

(73) Assignee: ARM LIMITED, Cambridge (GB)

( * ) Notice: Subject to any disclaimer, the term of this patent is extended or adjusted under 35 U.S.C. 154(b) by 196 days.

(21) Appl. No.: 15/569,399

(22) PCT Filed: May 2, 2016

(86) PCT No.: PCT/IB2016/052471
§ 371 (c)(1),
(2) Date: Oct. 26, 2017

(87) PCT Pub. No.: WO2016/178127
PCT Pub. Date: Nov. 10, 2016

(65) Prior Publication Data
US 2018/0293387 A1   Oct. 11, 2018

Related U.S. Application Data

(60) Provisional application No. 62/156,280, filed on May 3, 2015.

(51) Int. Cl.
*H04L 29/06* (2006.01)
*G06F 21/57* (2013.01)
(Continued)

(52) U.S. Cl.
CPC ............ *G06F 21/577* (2013.01); *G06F 21/00* (2013.01); *G06F 21/57* (2013.01); *G06F 21/575* (2013.01);
(Continued)

(58) Field of Classification Search
CPC .................................................... G06F 21/577
See application file for complete search history.

(56) References Cited

U.S. PATENT DOCUMENTS

| | | | |
|---|---|---|---|
| 2008/0082662 | A1 | 4/2008 | Dandliker et al. |
| 2009/0037393 | A1 | 2/2009 | Fredricksen et al. |

(Continued)

OTHER PUBLICATIONS

Ayday et al. "BP-P2P: Belief propagation-based trust and reputation management for P2P networks". In: 2012 9th Annual IEEE Communications Society Conference on Sensor, Mesh and Ad Hoc Communications and Networks (SECON). Jun. 21, 2012. Retrieved from <http://www2.ece.gatech.edu/research/labs/WCCL/BP_publications/secon_2012.pdf>.

(Continued)

*Primary Examiner* — Shawnchoy Rahman
(74) *Attorney, Agent, or Firm* — Eitan Mehulal Sadot

(57) ABSTRACT

Device, system, and method of managing trustworthiness of electronic device. For example, an Internet of Things (IoT) device is able to transmit data to a recipient device. The recipient device operates as a querying device, and utilizes a query agent to query a trust-management server with regard to the trustworthiness of the IoT device. The trust-management server receives from the IoT device a set of values indicating various parameters of the IoT device. The trust-management server generates a trustworthiness report pertaining to the IoT device, and sends the report as a response to the trustworthiness query. Optionally, a caching agent caches copies of trustworthiness reports and provides to querying devices such previous reports, together with an indication of their freshness level.

12 Claims, 6 Drawing Sheets

(51) Int. Cl.
*G06F 21/00* (2013.01)
*G06F 21/60* (2013.01)
*H04L 9/32* (2006.01)

(52) U.S. Cl.
CPC .......... *G06F 21/606* (2013.01); *H04L 9/3242* (2013.01); *H04L 63/045* (2013.01); *H04L 63/0421* (2013.01); *H04L 63/0884* (2013.01); *H04L 63/123* (2013.01); *H04L 63/14* (2013.01)

(56) References Cited

U.S. PATENT DOCUMENTS

| | | |
|---|---|---|
| 2011/0067101 A1 | 3/2011 | Seshadri et al. |
| 2011/0179477 A1* | 7/2011 | Starnes ................... G06F 21/52 726/9 |
| 2012/0233665 A1 | 9/2012 | Ranganathan et al. |
| 2013/0117849 A1 | 5/2013 | Golshan et al. |
| 2013/0247201 A1 | 9/2013 | Alperovitch et al. |
| 2013/0298244 A1 | 11/2013 | Kumar et al. |
| 2014/0281523 A1 | 9/2014 | Golino |
| 2014/0289794 A1* | 9/2014 | Raleigh ................... H04L 63/20 726/1 |
| 2017/0230179 A1* | 8/2017 | Mannan ................ H04L 9/0897 |

OTHER PUBLICATIONS

Olivereau et al. "Trustworthy Wireless Industrial Sensor Networks". Apr. 12, 2013. Retrieved from <http://www.cspforum.eu/TWISNet_WP3_D352_final.pdf>.

International Search Report for application PCT/IB2016/052471 dated Sep. 2, 2016.

Written Opinion of the International Search Authority for application PCT/IB2016/052471 dated Sep. 2, 2016.

* cited by examiner

SYSTEM, DEVICE, AND METHOD OF MANAGING TRUSTWORTHINESS OF ELECTRONIC DEVICES

CROSS-REFERENCE TO RELATED APPLICATIONS

This patent application is a National Stage of PCT International Application number PCT/IB2016/052471, having an International Filing Date of May 2, 2016, published as International Publication number WO 2016/178127 A1, which is hereby incorporated by reference in its entirety; which claims priority and benefit from U.S. provisional patent application No. 62/156,280, filed on May 3, 2015, which is hereby incorporated by reference in its entirety.

FIELD

Some embodiments may relate to the field of security of electronic devices.

BACKGROUND

Electronic devices are utilized for various purposes. For example, users often utilize smartphones, tablets, laptop computers, and other computing devices in order to browse the Internet, consume audio content and video content, play games, perform word processing tasks, send and receive electronic mail, engage in video conference and instant messaging, and perform other computerized tasks.

In the past few years, various "Internet of Things" (IoT) devices have been introduced and became common, for example, providing Internet connectivity to certain appliances and allowing them to transmit information to a remote recipient.

DETAILED DESCRIPTION OF SOME DEMONSTRATIVE EMBODIMENTS

Figure 1:
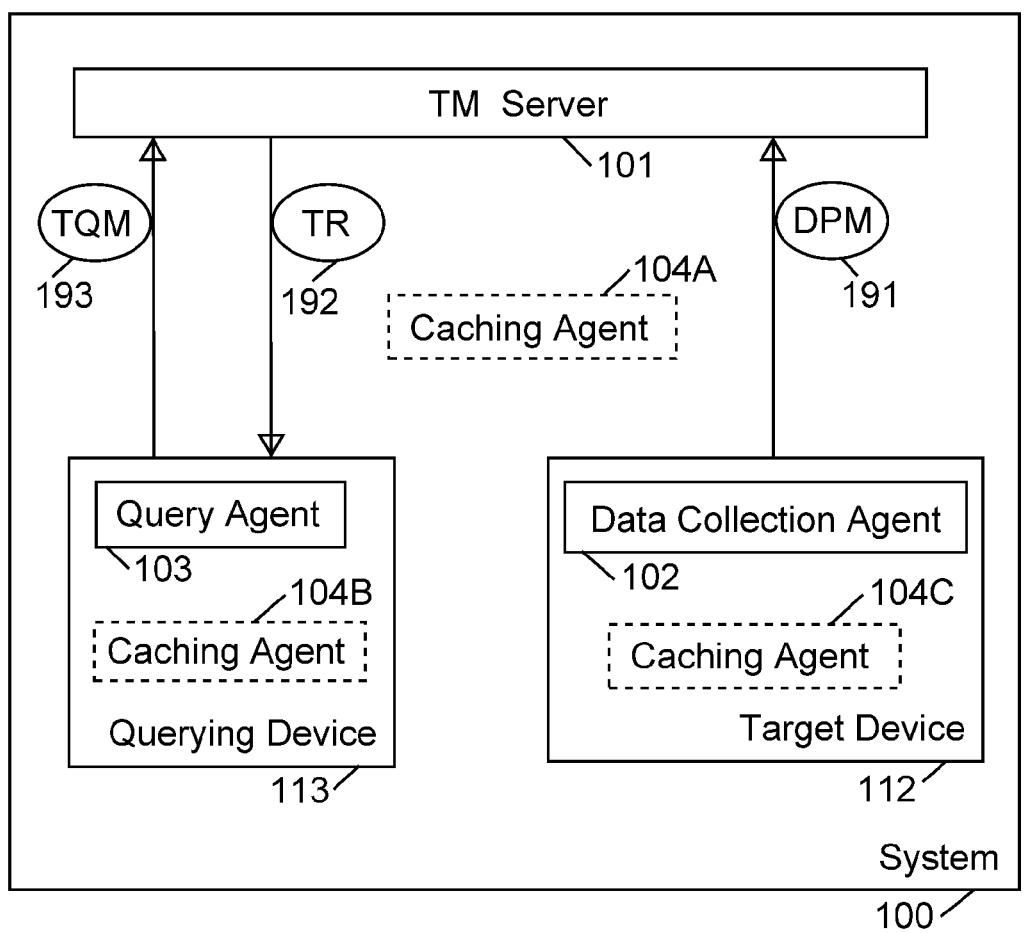
FIG. 1 is a schematic block-diagram illustration of a system, in accordance with some demonstrative embodiments.

At an overview, some embodiments may provide a system or a service framework that allow devices, servers, and interested parties to ensure, verify and/or confirm the identity and/or trustworthiness of one or more deployed appliances or devices, particularly "Internet of Things" (IoT) devices and/or Internet Protocol (IP) connected devices.

For example, an IoT device may be able to transmit data to a recipient device. The recipient device may operate as a querying entity, and may utilize a query agent to query a trust-management server with regard to the trustworthiness of the IoT device. The trust-management server may receive from the IoT device a set of values indicating various parameters of the IoT device. The trust-management server may generate a trustworthiness report pertaining to the IoT device, and may send the report to the querying entity, as a response to the trustworthiness query. Optionally, a caching agent may cache copies of trustworthiness reports and may provide to querying entities such previous reports, together with an indication of their freshness level.

In accordance with some embodiments, for example, a trustworthiness query may be sent or transmitted from a relying party (e.g., by a Query Agent of a Querying Device) to a computerized server, which may be referred to as a "Trustworthiness Management Server" or a "Trust Management Server" or "TM Server", indicating the identity of a subject device (e.g., a Target Device). In response, the TM Server may send or transmit a response message, indicating a level of trustworthiness level of the subject device (e.g., the Target Device). In a demonstrative implementation, the level of trustworthiness may be indicated by a set of scores or numerical values, and may be delivered in a machine-readable format or in accordance with a pre-defined data structuring format. The received trustworthiness score may be used by the querying party (or the relying party, such as by the Querying Device), as part of a risk management process; and the querying party (e.g., the Querying Device, or a system that is associated therewith) may accordingly determine or may modify one or more parameters of its interactions with the subject device (e.g., with the Target Device).

The Applicants have realized that security of IoT devices may present various challenges, due to the particular characteristics of such IoT devices.

As a first example, the Applicants have realized that a diversity of IoT devices exists and may continue to evolve, thereby placing numerous types of IoT devices in communication with various types of other devices, computers and servers. Each such IoT device may have different properties, and its structure and/or functioning may not necessarily follow a particular standard or protocol. For example, a first IoT device may be a sensor (e.g., smoke detector) utilizing a simple 8-but controller running on an internal ten-year battery; a second IoT device may be a multi-core control hub; and a third IoT device may be a smart television able to connect to the Internet and able to process and display streaming High Definition (HD) video. Such devices are different from one another in multiple properties: their hardware, their Operating System (OS), their type of software, their level of assurance, their ability to support one or more security protocol, the type of user that utilizes them (e.g., a novice user, a proficient user; a home user, an enterprise user or organizational user); and other properties.

As a second example, the Applicants have realized that a main feature of IoT devices is their connectivity, namely their ability to wirelessly connect with a remote server or remote computer or other remote electric device (e.g., a smartphone, a tablet, a laptop). Accordingly, IoT devices may be associated with a wider attack surface by potential attackers (e.g., wider relative to a legacy appliance that has no Internet connection, or wider relative to a conventional device that utilizes a wired communication link), as an IoT device may imply multiple ports or opportunities for an attacker to possibly utilize in order to compromise the IoT device and/or in order to utilize it for penetrating a communication network.

As a third example, the Applicants have realized that "future proofing" of IoT devices may be required. For example, an Internet-connected smoke detector may be provided to a consumer with an internal ten-year battery, and with a vendor promise to function properly for ten years. Accordingly, security mechanisms that are associated with such IoT device, may need to remain relevant, operational, and adequately functioning for a decade. Optionally, a renewability mechanism may need to be deployed such that security mechanisms that were designed to last a decade, may actually be broken or compromised earlier. The Applicants have further realized that some IoT devices that are designed to operate for many years, may actually lack an adequate ability to be patched; or may need to be certified or re-certified, thereby requiring the patching process to be performed in long and complex cycles.

As a fourth example, the Applicants have realized that some IoT devices may suffer from relatively smaller industry know-how. Security of IoT devices is a relatively new domain, and there are fewer standards that are relevant to this domain. Moreover, there may not be adequate industry practices for securing IoT devices or IoT networks. For example, when a vendor develops a new IoT device, the vendor is often left on its own with regard to securing the IoT device, with little or no standards to follow, or with little or no industry standards to follow. Securing unfamiliar platforms, where no standard practices are available, may require a greater know-how by such vendor; and leaves more room for undesired improvisation and errors.

Accordingly, the Applicants have realized that in the relatively-new domain of IoT, numerous IoT devices may be at an insecure state at any given moment, and/or may be exposed to attacks, and/or may be relatively easily compromised. The Applicants have further realized that the industries, the users, the organizations and the enterprises that rely on IoT devices, may need to adapt and prepare their infrastructure in order to function properly a situation where a portion of an IoT network may include one or more non-trustworthy IoT devices, temporarily or permanently.

In accordance with some embodiments, the TM Server may operate a mechanism that allows each relying device that relies on other devices, to ascertain their trustworthiness state when needed, and thus augment or update its risk management process with relevant trustworthiness data. Accordingly, trust management may be provided and enabled with regard to IoT devices.

In addition to having to identify each IoT device, a target IoT device may need to be trusted by a relying party to properly follow commands, and to submit or transmit valid data. For example, falsified input data that is transmitted to an IoT device, or improper or compromised operation of the IoT device, or falsified data outputted by the IoT device, may cause severe damage to the system in which the IoT device is deployed. Moreover, since IoT systems may rely on multiple levels of interaction, it may be possible for one compromised IoT device to introduce maliciously erroneous information, or to perform malicious operations, that may also cause secondary and tertiary effects and may compromise other parts of the network, as well as other connected networks and systems.

In accordance with some embodiments, trust management for IoT devices may be involved in any and all life-cycle scenarios, starting with network enrollment and re-enrollment, as well as enrollment with external service providers. Trust management for IoT devices may further provide support to potential network peers wishing to verify the identity and/or integrity of a target IoT device before providing it with a connection to the local network, gateway, service framework, and/or other resources. Policies defining the permissions between local users, devices, operations and resources may be facilitated to rely on accurate IoT device trustworthiness information.

As a first demonstrative use-case, the TM server may be utilized for validating IoT device identity consistency. For example, a service provider may wish to be aware of the fact that an IoT device that it used to interact with (and thus trust), was actually replaced by another IoT device, even if the new IoT device shows similar, or even identical, characteristics and/or behavior. Such IoT device replacement may have been benign and approved, or may have been part of an attempt to compromise the system. In order for the service provider to be able to ascertain the legitimacy of such IoT device replacement event, the service provider may need to know firstly that the IoT device replacement event has occurred; and this may be accomplished by utilizing the TM server.

As a second demonstrative use-case, the TM server may be utilized for validating IoT device trustworthiness. In many scenarios, vendors, users, and service providers for IoT devices may be interested in preserving the perceived trustworthiness of their IoT devices, by receiving indications when trustworthiness has declined. Indicators for reduced trustworthiness of an IoT device may result, for example, from code and configuration integrity that is seen to be violated, or from the code patching state of the IoT device. The following are a few examples for situations where indicators on reduced trustworthiness of an IoT device may be generated and may be utilized by a relying party: (a) a user installs an IP-connected camera, and wishes to secure it from being tampered-with and reprogrammed to transmit video to a rogue server; (b) a utility company installs "smart meters" (e.g., IP-connected electricity meters, gas meters, water meters) in homes, and may wish to validate the trustworthiness of such smart meters, to ensure that they are not being circumvented by customers; (c) a remote, central, service that manages data from household thermostats, for the purpose of optimizing Heating, Ventilating, and Air Conditioning (HVAC) units, may require an indication of trustworthiness of such devices, in order to help preventing vulnerable devices from participating in data collection, and/or to reduce contamination of the data-set utilized by such central service; (d) an online service provider that manages access permissions to smart door-locks may require trustworthiness indicators pertaining to the installed door-locks, in order to disclaim liability for vulnerable or compromised door-locks, and/or in order to require the users or owners of such door-locks to update or replace them. In the above-mentioned scenarios, the service provider may utilize the TM server in order to query regarding the trustworthiness of a particular IoT device, as a step towards trusting (or not trusting) input received from that IoT device and/or for ensuring that commands sent to that IoT device are followed as expected.

As a third demonstrative use-case, the TM server may be utilized for regaining trust in IoT devices. A service provider that obtains trustworthiness indicators as described above, may be interested in recovering trustworthiness of IoT devices for which a decreased trustworthiness level was indicated, when feasible. For example, a home user may install on his network a gateway, e.g., a hub or concentrator device for routing Internet traffic to constrained devices. The gateway may be less resource-constrained, and may run a full operating system (e.g., a variant of Linux®). Such gateway may be susceptible to one or more known vulnerabilities, for example, "Shellshock" vulnerability or "Bashdoor" vulnerability, associated with an outdated version of the Linux® bash software module. The vulnerability may be detected by the TM server when the gateway reports to the TM server the details of executable modules installed therein, including the version of bash, which matches a version reported in a known vulnerability report (e.g., in CERT vulnerability report CVE-2014-6271). As a result, the TM server may reduce the trustworthiness score for that gateway, reporting that it may need to be disconnected or patched or replaced. Optionally, the TM server may further propose corrective actions, by providing a hyperlink or other pointer to a suitable patch or to an updated software image provided by the gateway's vendor, which the user may download and apply to repair the gateway. Subsequently, the gateway may be patched based on the proposed corrective action, and accordingly, the trustworthiness score(s) that are associated with the patched gateway may increase or may be updated to reflect the increased level of trustworthiness.

Reference is made to FIG. 1, which is a schematic block-diagram illustration of a system 100 in accordance with some demonstrative embodiments. System 100 may be a demonstrative implementation of a trust-management or trustworthiness-management (TM) system.

System 100 may comprise, for example: a TM server 101; a target device 112 comprising a data collection agent 102; and a querying device 113 comprising a query agent 103. System 100 may optionally comprise one or more caching units, for example, caching agents 104A-104C. It is noted that any one or more of the components of system 100, may optionally comprise one or more of the computing resources 600 of FIG. 6 (described herein).

System 100 may operate to provide trustworthiness data (e.g., trustworthiness report, score(s), indicators) to querying device 113, with regard to the trustworthiness of target device 112 (e.g., an IoT device whose trustworthiness is being queried).

For example, data collection agent 102 of target device 112 may measure, sense, determine and/or collect values of parameters of target device 112 and/or its hardware components and/or its software components. Target device 112 may send or transmit a Device Parameters Message (DPM) 191 to TM server 101. Then, TM server 101 may analyze the received Device Parameters of target device 112, in relation to known threats and vulnerabilities, and optionally taking into account known corrective actions that may cure threats and vulnerabilities or that may otherwise improve or increase the trustworthiness of the target device 112. TM server 101 may generate a Trustworthiness Report (TR) 192, which may comprise one or more Trustworthiness Scores with regard to target device 112, or with regard to various multiple components of target device 112. Subsequently, querying device 113 may utilize its query agent 103 to generate a Trustworthiness Query Message (TQM) 193 which inquires about the trustworthiness of target device 112; and querying device may send or transmit the TQM 193 to TM server 101. In response to the received TQM 193, the TM server 101 may send or transmit back to querying device 103 the TR 192 pertaining to target device 112.

TM server 101 may be or may comprise a centralized server or computer, a local server, a remote server, a "cloud computing" server or device, a Web-based server, an application server, a specific-purpose server or computer or machine, or the like. TM server 101 may collect all Device Parameters that apply to all target devices 112 in system 100; may run or execute the inference logic described herein; and may respond to trustworthiness queries submitted by various query agents 103 of various querying devices 113, by sending back Trustworthiness Reports.

Data collection agent 102 may be installed in, and may run on, each target device 112 (e.g., IoT device) that is enrolled in system 100 or is subscribed to receive trust-management services from system 100. In some implementations, data collection agent 102 may be integrally embedded in, or may be integrated in, or may be an integral part of, the target device 112; or may be hard-wired within target device 112, or may be otherwise unified with target device 112. In other implementations, data collection agent 102 may be an add-on module or unit which may be added to, or coupled to, or be operationally associated with, the target device 112. Data collection agent 102 may report measurements to TM server 101, via a wired or wireless communication link (e.g., a cellular communication link, Internet connection, TCP/IP connection, over Wi-Fi or Wi-Max, or the like); and may further provide and prove the unique Device-ID of target device 112 to relying entities.

Query agent 103 may be installed in, and may run on, a device that requests or consumes or utilizes Trustworthiness Reports or Score(s), for example, on querying device 113. Query agent 103 may query the TM server 101 for trustworthiness data, and may comprise the means to validate and/or process (e.g., act upon) incoming trustworthiness reports. In some implementations, Query Agent 103 may be integrally embedded in, or may be integrated in, or may be an integral part of, the Querying Device 113; or may be hard-wired within Querying Device 113, or may be otherwise unified with Querying Device 113. In other implementations, Querying Agent 103 may be an add-on module or unit which may be added to, or coupled to, or be operationally associated with, the Querying Device 113.

One or more caching agents may optionally be comprised in system 100. In a demonstrative example, a first caching agent 104A may be a standalone device; and/or a second caching agent 104B may be installed in (or may be part of) querying device 113 (e.g., alongside the query agent 103); and/or a third caching agent 104C may be installed in (or may be part of) target device 112 (e.g., alongside the data collection agent 102). Each such caching agent (104A, 104B, 104C) may cache Trustworthiness Reports or Trustworthiness Scores (and/or other trustworthiness data), to reduce redundant queries and/or to improve availability on networks with low or intermittent connectivity.

Figure 2:
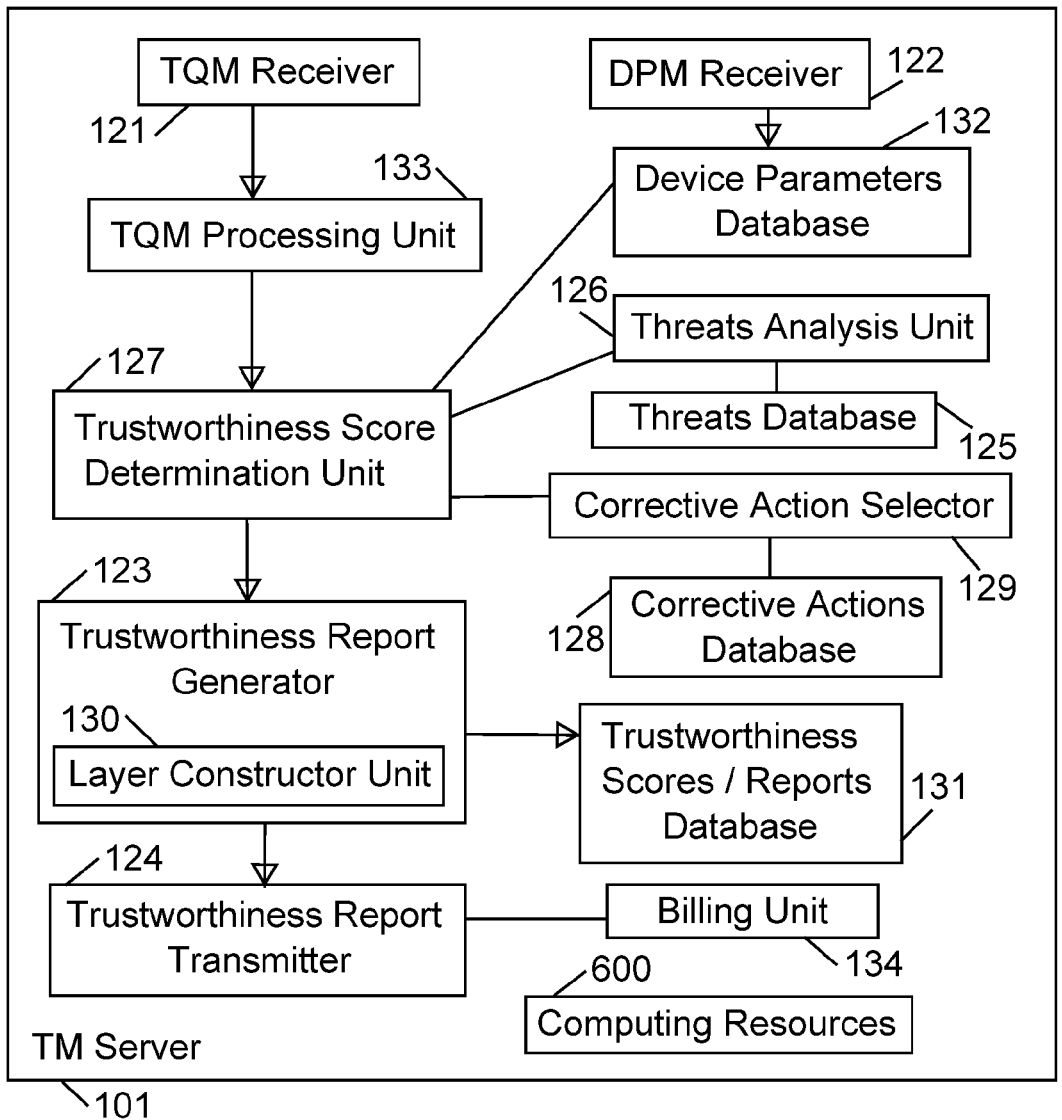
FIG. 2 is a schematic block-diagram illustration of Trustworthiness Management (TM) server, in accordance with some demonstrative embodiments.

Reference is made to FIG. 2, which is a schematic block-diagram illustration of TM server 101, in accordance with some demonstrative embodiments. TM server 101 may comprise, for example: a Trustworthiness Query Message (TQM) receiver 121, able to receive an incoming TQM (e.g., from query agent 103 of querying device 113), and able to pass it to a TQM processing unit 133; a Device Parameters Message (DPM) receiver 122, able to receive a DPM from target device 112, and able to extract from it Device Parameters which may be stored in a Device Parameters database 132; a trustworthiness score determination unit 127 able to determine a trustworthiness score with regard to the entirety of target device 112, and/or able to determine discrete trustworthiness scores with regard to various discrete components of target device 112; a trustworthiness report generator 123 able to generate a trustworthiness report pertaining to target device 112, the trustworthiness report comprising one or more trustworthiness scores pertaining to target device 112 and/or pertaining to its various components; and a trustworthiness report transmitter 124 able to send or transmit the trustworthiness report to querying device 113, in response to its trustworthiness query message. TM server 101 may optionally comprise one or more of the computing resources 600 of FIG. 6, and/or other suitable hardware components and/or software components.

TM server may further comprise, for example: a threats database 125 able to store data about known threats and/or vulnerabilities to various electronic devices, computerized devices, appliances, and/or IoT devices; a threat analysis unit 126 able to estimate or determine whether target device 112 is or may be exposed to one or more particular threats, in view of its device parameters and in view of known threats and vulnerabilities; a corrective actions database 128 able to store known corrective actions which may cure or mitigate some or all of the known threats and/or vulnerabilities; a corrective action selector 129 able to select a particular corrective action which may cure or mitigate a particular threat or vulnerability that is estimated by TM server 101 to exist in target device 112; a layer constructor unit 130, able to construct multiple layers of data in generated trustworthiness reports; a trustworthiness scores/reports database 131 able to store some or all of the trustworthiness reports that are generated and/or updated by TM server; and/or other suitable hardware components and/or software components.

The above-mentioned components of TM server 101 may be co-located within a single server (e.g., encapsulated within a single housing or box), or may be distributed across multiple units or devices or locations which may communicate among themselves by using wired and/or wireless communication links. Two or more of the above-mentioned components of TM server 101 may optionally be implemented by using a single, unified, component or unit that performs two (or more) functions or operations.

TM server 101 may aggregate all Device Parameters and Trustworthiness Reports and Scores of enrolled target devices 112. For example, TM server 101 may store Device Parameters in local or remote Device Parameters database 132. TM server 101 may store information about known threats in a local or remote Threats Database 125. TM server 101 may further store information about known corrective actions in local or remote Corrective Actions database 128. Optionally, such databases may be co-located within or with TM server 101, or may be located in local proximity to TM server 101, or may be remote to TM server and may be accessed over a wired or wireless communication link, or may be implemented using "cloud computing" repositories or data centers, or other suitable implementations.

Based on the stored Device Parameters that were collected and received from each target device 112, and based on known threats and known corrective actions, TM server 101 may utilize its trustworthiness score determination unit 127 to generate a suitable trustworthiness score value (or indicator, or set-of-indicators) that corresponds to a level of trustworthiness of each particular a target device 112 (and/or to each component or module of each target device 112). The Trustworthiness Score value of each such target device 112 may be stored in a Trustworthiness Score database 127, which may be modified or updated as new Trustworthiness Score values are generated or updated by the trustworthiness score determination unit 127. The trustworthiness report generator 123 may generate a trustworthiness report, which may comprise one or multiple such trustworthiness scores that pertain to a particular target device 112.

TM server 101 may utilize its trustworthiness query receiver 121 to receive an incoming trustworthiness query from querying device 113. The trustworthiness query processing unit 133 may process such query, for example, by looking-up or locating or finding the relevant trustworthiness report (or score(s) or indicators) in the trustworthiness scores/reports database 131, which corresponds to the particular target device 112 to which the particular trustworthiness query pertains. The trustworthiness report transmitter 124 may then transmit or send back the found trustworthiness report to querying device 113. It is noted that in some implementations, optionally, TM server 101 may not necessarily utilize or comprise, or may not necessarily be associated with, a database for storing Device Parameters and/or a database for storing the generated trustworthiness report(s); rather, in some implementations, TM server 101 may freshly and/or dynamically generate a trustworthiness report (and/or one or more trustworthiness scores or indicators) on-the-fly or on-demand, for example, in response to a trustworthiness query message received from querying device 103, without necessarily storing data and/or reports in database(s).

Optionally, the corrective action selector 129 of TM server 101 may select, generate, and send out (e.g., to querying device 113), a corrective action message which may indicate to querying device 113 (or to a user or owner thereof) one or more corrective actions that are proposed by TM server 101 in order to cure or address or reduce or mitigate one or more threats or vulnerabilities that TM server 101 may detect or may estimate to exist in target device 112, and/or in order to otherwise improve and/or increase the trustworthiness and/or security and/or operational stability of target device 112 (e.g., a corrective action which proposes or advises to upgrade or to update a particular software module from version 2.1 to version 2.2, when such upgrade or update is not necessarily due to security-related issues, but rather is proposed in order to promote operational stability of target device 112). The corrective action message may be generated based on, for example, detecting (e.g., by the corrective action selector 129 of TM server 101) that the Device Parameters of the particular target device 112, correspond to a known threat which may appear in the threats database 125, and for which a corrective action exists in a corresponding record in the corrective actions database 128.

TM server 101 may optionally comprise, or may optionally be associated with, a billing unit 134 able to perform billing and/or collection operations, or other monetary transactions, with regard to trustworthiness queries and/or reports. For example, billing unit 134 may bill an owner of querying device 113, based on one or more pre-defined billing policies or tariffs; e.g., on a per-query basis, on a per-time-period basis, or the like. Additionally or alternatively, billing unit 134 may bill an owner of target device 112, based on one or more pre-defined billing policies or tariffs; e.g., on a per-day or per-week or per-month basis, as a one-time fee or a recurring fee, at particular time-intervals. In some implementations, billing may be triggered if, or only if, a threat is estimated or detected to exist in target device 112; or if other pre-defined conditions hold true. In some implementations, one or more features (e.g., a total Trustworthiness Score value of target device 112) may be provided for free, whereas one or more other features (e.g., particular trustworthiness indicators of components of target device 112; or corrective action proposals) may be provided for a fee and/or as a premium service. Other suitable billing schemes may be used.

Trustworthiness score determination unit 127 may operate in accordance with predefined inference logic, which may be a code or set of instructions. Trustworthiness score determination unit 127 may receive as input the values of Device Parameters (e.g., of a particular target device 112); may process these values in accordance with predefined algorithms and/or lookup tables, optionally utilizing or defining intermediate variables; and may produce, and may generate as output, a Trustworthiness Score value, or one or more Trustworthiness Indicators related to target device 112. For example, trustworthiness score determination unit 127 may be implemented by utilizing interpreted code or script that is executed by an interpreter program or virtual machine, or by utilizing compiled code or other executable program.

In some implementations, trustworthiness score determination unit 127 may utilize an interpreter or program which may run in a strictly limited, secured, sandboxed process, which may separately and securely execute the inference logic for each enrolled target device as soon as new input data is collected or received or otherwise becomes available; or as soon as other triggering conditions hold true. For example, publication of a new vulnerability or threat, in certain versions of a device driver or an Operating System (OS), may trigger the re-calculation of Trustworthiness Score values for some or all of target devices 112 whose Device Parameters indicate that they include the vulnerable device driver or the vulnerable OS. The execution model of the inference logic of trustworthiness score determination unit 127 may allow for frequent logic updates, for example, as the inference logic improves, and/or as new Device Parameter fields are introduced into the system, and/or as new threats and vulnerabilities become known.

TM server 101 may send back to the query agent 103 (of the relevant querying device 113 from which the trustworthiness query message originated) a response message, with regard to the particular target device 112 that was identified in the trustworthiness query message (e.g., by using a unique Device-ID number or string which identifies the particular target device 112). The response message may comprise a Trustworthiness Report, or one or more Trustworthiness Scores or values, or other trustworthiness indicators or ratings that quantify the level of trustworthiness of target device 112 and/or its components, and/or the level of security that is estimated to exist at target device 112 and/or its components. The type and/or the number of Trustworthiness Scores that may be included in the Trustworthiness Report may depend on the information that the TM server 101 has on the target device 112; and may optionally depend also on a commercial agreement between the operator of TM server 101 and the owner or operator of querying device 113. For example, one or more tiers of Trustworthiness Scores or indicators (e.g., "basic trustworthiness indicators") may be provided to querying device 113 for free; whereas one or more other tiers of Trustworthiness Scores or indicators (e.g., "premium trustworthiness indicators") may optionally be provided to the querying device 113 only upon payment of a predefined fee.

Some implementations may optionally utilize multiple layers of Trustworthiness Score(s), which may optionally take into account the passage of time and/or the level of freshness of the information that such scores reflect. For example, query agent 103 may utilize (e.g., may rely on) a received Trustworthiness Score for a period of time that may extend beyond the time during which the assessment that is reflected in the Trustworthiness Score is entirely accurate. In order to support such scenario, each Trustworthiness Score may optionally comprise multiple layers of values; and each layer of values may optionally be associated with a freshness indicator, or with an expiration date indicator, or with indicator that reflects gradual expiration of the information.

For example, each Trustworthiness Score may comprise multiple values, and each value may be assigned an age (e.g., expressed in hours, or other time intervals). The query agent 103 may measure the time or count the hours that elapse since the Trustworthiness Score report was generated, or (e.g., in lieu of real-time information) since the Trustworthiness Score report at the query agent 103. The age value in each layer of the Trustworthiness Score may be greater than the age value of the layer preceding it. For example, a certain Trustworthiness Score may have a value of "5" for the first 24 hours of age, followed by a value of "3" for the following 96 hours.

Once the age of the last layer elapses, the Trustworthiness Score is entirely expired and should no longer be used (namely, should no longer be relied upon, by the querying device 113). A trustworthiness report that comprises one or more Trustworthiness Scores may be considered as fully expired once all the Trustworthiness Scores that it comprises have expired. Until such complete expiration, the Trustworthiness Score report may optionally be assigned one of multiple (e.g., four) possible Freshness Levels, as described herein.

For example, trustworthiness report generator 123 may comprise or may utilize the layer constructor unit 130, which may implement inference logic that processes the Device Parameters of the target device 112 and may determine, for each Trustworthiness Score value, its suitable layering and the age-value for each such layer. In order to determine the layers, the inference logic utilized by trustworthiness report generator 123 may check and/or analyze the expiration dates or expiration times of the Device Parameters that were used to compute the Trustworthiness Score. The age at which a Device Parameter becomes obsolete, may be the age after which a new Trustworthiness Score value should be used. In a demonstrative example, the new Trustworthiness Score value may be equivalent to the value that would have been computed had that Device Parameter been a "missing value" or an "unknown value".

The inference logic that is utilized by trustworthiness report generator 123 may take into account data that is available in threats database 125, and/or other publicly-available data or proprietary data with regard to threats and/or vulnerabilities (e.g., publicly-available vulnerability information obtained from the CERT Division of the Software Engineering Institute).

In addition to providing indicative trustworthiness score values regarding the trustworthiness of target device 112, the TM server 101 may optionally support generation and transmission of proposals for corrective actions. For example, a corrective action may be represented as a string or other data-item which indicates to querying device 113, which actions to perform or which resource(s) to utilize in order to patch or cure a vulnerability in a particular target device 112 that the querying device 113 has inquired about; or in order to otherwise upgrade or update such target device 112, e.g., for the purpose or reducing its exposure to security risks.

A corrective action may be, for example, a recommendation to apply a particular patch to the target device 112, in order to cure a particular known "bug" or deficiency that may have security implications or other implications (e.g., a bug or error that may cause the target device to operate incorrectly, or to produce inaccurate output data). For example, TM server 101 may detect that target device 112 runs a vulnerable version of the "bash" module; and may thus propose to the querying device 113 to arrange for updating or replacing that vulnerable version with a more-secure version, e.g., by providing a hyperlink or other pointer to an online resource storing the updated version of that module.

Additionally or alternatively, a corrective action may be or may comprise, for example, a recommendation to apply a general upgrade or general update to the target device 112, without necessarily being tied to a particular known vulnerability, in order to ensure that target device 112 utilizes the most-updated drivers, modules, Operating System, or applications; such as, for example, a corrective action that proposes that a certain Operating System of target device 112 would be upgraded from its current "Service Pack 1" to a currently-available "Service Pack 2". Other suitable corrective actions may be generated and proposed.

In some implementations, a corrective action may be or may comprise a literal string that is provided to query agent 103 of querying device 113 as part of the response to its query about a particular target device 112; and the corrective action need not necessarily be machine readable. In other implementations, optionally, a corrective action may be or may comprise a machine-readable code or script, or command or set of commands, that may be executed or otherwise utilized by the querying device 113 and/or by the target device 112 in order to perform the corrective action.

Figure 3:
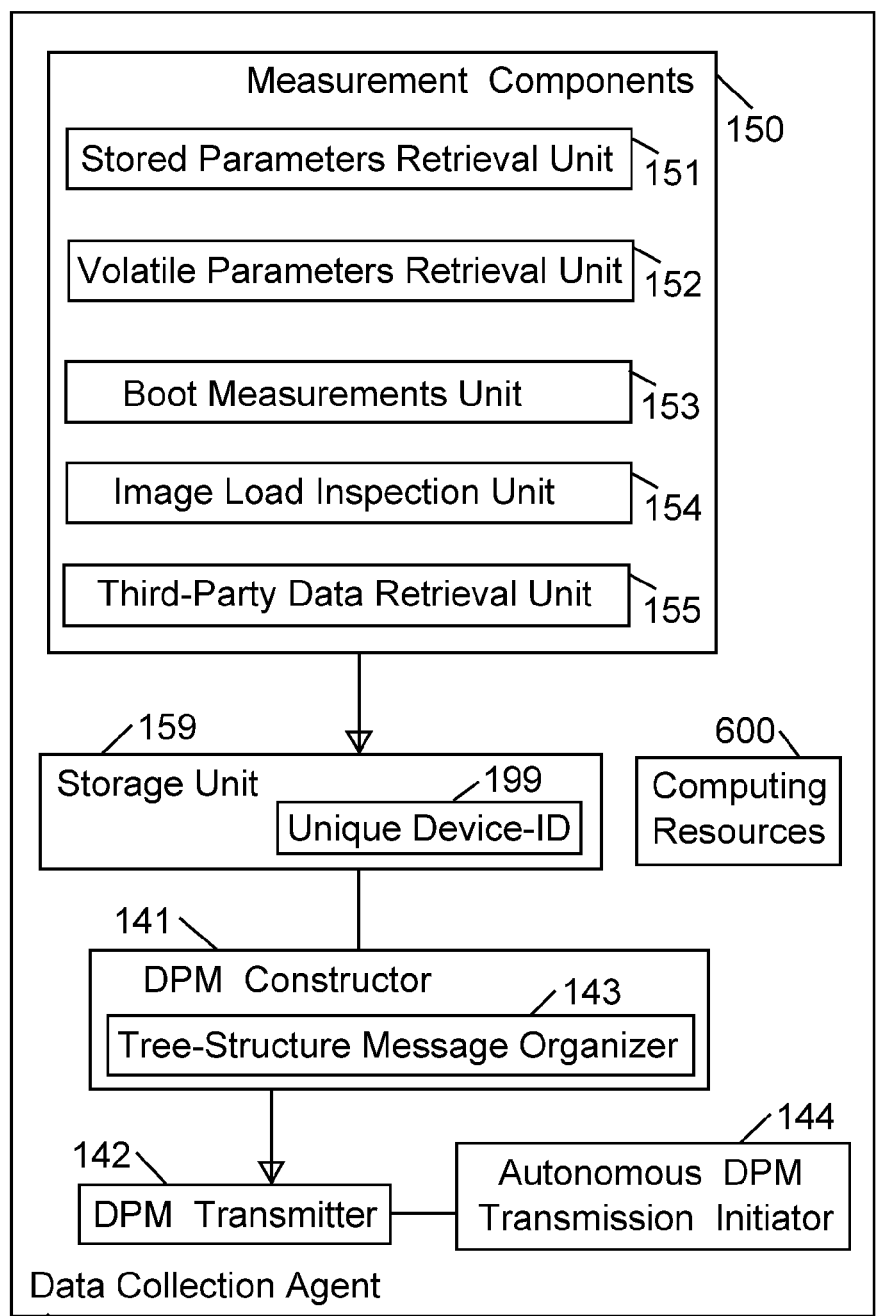
FIG. 3 is a schematic block-diagram illustration of data collection agent, in accordance with some demonstrative embodiments.

Reference is made to FIG. 3, which is a schematic block-diagram illustration of data collection agent 102, in accordance with some demonstrative embodiments. Data collection agent 102 may be installed or embedded in, and/or may otherwise run on, each target device 112 that is enrolled in the TM system or otherwise subscribed to the TM service. Data collection agent 102 may optionally comprise one or more of the computing resources 600 of FIG. 6, and/or other suitable hardware components and/or software components. Data collection agent 102 may collect and provide Device Parameters that characterize the target device 112 (and/or its various components, units and modules) or that originate on the target device 112. Optionally, in order to meet constraints of some IoT devices, data collection agent 102 may be implemented as a "thin" module utilizing reduced amount of code and utilizing reduced amount of storage.

Data collection agent 102 may comprise multiple measurement components 150 or measurement units or measurement modules; and may output a list or set of discrete values that correspond to various Device Parameters; and/or combined or aggregated outputs from its various measurement components. Optionally, one or more of measurement components 150 may perform measurements substantially at the time of reporting, or immediately prior to such reporting. Optionally, one or more of measurement components 150 may perform their measurements beforehand, prior to such reporting (e.g., during a boot process or an initialization process of the target device 112; or at predefined time(s) or time intervals), and may temporarily store the measured values for subsequent reporting. For example, boot-time measurements of the target device 112 may be performed during a boot process or boot sequence of the target device 112, before a communication module of the target device 112 is ready to send or transmit data; and thus the measured values may be stored until their subsequent reporting.

The various measurement components 150 of data collection agent 102 may be implemented by utilizing various hardware units and/or software units, which may further utilize pre-defined mechanisms or techniques for protection, security, anti-tampering, and/or privilege level(s); resulting in different levels of security and trustworthiness which may be associated with the outputs of such measurement components. The trustworthiness level of all reported Device Parameters may be upper-bound by the level of protection that exists for an association key shared with the TM server 101 (e.g., as discussed herein), and the degree to which the caller of the routine that signs the measured data can be ascertained securely.

In a demonstrative implementation, data collection agent 102 may comprise one or more of the following measurement components 150: a stored parameters retrieval unit 151, a volatile parameters retrieval unit 152, a boot measurements unit 153, image load inspection unit 154, a third-party data retrieval unit 155. Other suitable measurement components 150 may be used, as well as other types of device scanning modules, device diagnostics modules, device inspection modules, device analysis modules, or the like.

One or more of the measured values may be stored, for example, temporarily, in a volatile or non-volatile storage unit 159 to which the data collection agent 102 may have access (e.g., implemented as part of the data collection agent 102 when it is implemented as a hardware unit; or implemented as Random Access Memory (RAM) or Flash memory or other suitable memory unit or storage unit which may be part of target device 112).

The stored parameters retrieval unit 151 may obtain from the target device 112, and may output, fixed or non-changing device data; for example, brand data or maker data or manufacturer data, model data, long-term configuration variables in non-volatile storage, and previously-stored results of values obtained by other measurement components.

The volatile parameters retrieval unit 152 may obtain or retrieve from the target device 112 its peripheral hardware states, software states, and other Device Parameters which are volatile.

The boot measurements unit 153 may run at or during boot time or boot process of the target device 112, and may measure the elements of boot chain or boot sequence of the target device 112. For example, the boot measurements unit 153 may cryptographically sign the measured values, and may store them in storage unit 159 to be subsequently retrieved as pre-stored parameters at time of reporting.

The image load inspection unit 154 may runs at image load time of target device 112, and/or prior to the first execution by target device 112 of software that is read from a modifiable storage. The image load inspection unit 154 may check software signatures, and/or may extract and record software module(s) data.

The third-party data retrieval unit 155 may obtain or read or retrieve data from third-party applications which may be installed on the target device 112 and/or which may be otherwise accessible by the target device 112. The third-party data retrieval unit 155 may call one or more Application Programming Interfaces (APIs) that may be exposed or otherwise become known (e.g., by application vendors). For example, public APIs may be used to query an "AllSeen" agent (e.g., an agent or module of an "AllSeen" connectivity service, or other suitable connectivity service, for connecting IoT devices over a local network) on the target device 112 for its current state. Supported APIs may be added in cooperation with the vendor or maker of target device 112.

Each particular target device 112 may have a unique Device-ID 199 number or string or identifier. The unique Device-ID 199 for each particular target device 112 need not represent any specific meaning, other than being a unique identifier for the device, and being persistent and non-changing. In some implementation, a particular target device 112 may be able to prove that it possesses a particular unique Device-ID 199, for example, by using the associated private key and public key. The following discussion demonstrates some optional processes for creating, utilizing, and replacing a unique Device-ID 199.

With regard to creation of unique Device-ID 199, each target device 112 may have a key pair ($P'_D$, $P_D$) that is permanent (or, in some implementations, is permanent until a factory-reset process is performed). The key pair may be hard-coded and stored securely in protected hardware and/or protected firmware of the target device 112. The key pair may be generated by the device itself; or may be generated externally.

If the private key is generated by and within target device 112 itself, then the private key is known only to target device 112, and is not shared with any external entity. If the private key is generated externally to target device 112, then the private key is stored and kept only within target device 112. The private key ($P'_D$) of target device 112 is available for use only by the data collection agent 102 running on target device 112.

The value of unique Device-ID 199 may be, for example, a cryptographic hash of the public key ($P_D$) of the target device 112, or a cryptographic hash of another cryptographic key (e.g., an authentication key) of target device 112, or a cryptographic hash of another cryptographic key or other value or parameter that is securely stored within target device 112. This unique Device-ID 199 is indeed unique to the extent that the key-pair of target device 112 was indeed generated at randomly or pseudo-randomly, and to the extent that the cryptographic hash function does not have collisions. Optionally, the unique Device-ID 199 may be truncated (or may be equivalent to a truncated portion of the full hash result), as long as the collision-freedom is considered to be preserved.

The unique Device-ID 199 of target device 112 may be subject to anonymization and reporting. For example, in a demonstrative implementation of a particular target device 112 that is enrolled with (or discoverable by) TM server 101, the data collection agent 102 of target device 112 may send its collected Device Parameters to the TM server 101, in association with the unique Device-ID 199 of that particular target device 112. For example, a shared association key may be used between (i) that instance of the data collection agent 102, and (ii) the TM server 101. Optionally, multiple (and different) association keys may be used, for example, if multiple measurement components of the data collection agent belong to different trust domains. Accordingly, a Device Parameters Message (DPM) 191 may be constructed by a DPM constructor unit of data collection agent 102; and may be transmitted to TM server 101 by a DPM transmitter unit of data collection agent 102.

In some scenarios, in which the TM server 101 is not readily accessible to target device 112, the data collection agent 102 may not report the unique Device-ID 199 as part of its reported Device Parameters; neither can it use an association key, as the target device 112 was not yet enrolled with the TM server 101 and thus an association key may not yet exist. Instead, the data collection agent 102 may report its unique Device-ID 199 directly to a query agent (e.g., to query agent 103 of querying device 113), using a separate protocol. In such case, Device Parameters in the form of DPM 191 may be delivered directly from data collection agent 102 to query agent 103 (rather than to TM server 101), and may be encrypted (at and by the data collection agent 102 of target device 112, prior to transmission) using a temporary message key. The temporary message key is itself encrypted using the public key of TM server 101; and the encrypted temporary message key may be included in the final message that is transported from data collection agent 102 to query agent 103. In such cases, query agent 103 may report a fake unique Device-ID (e.g., obtained from a pre-defined name-space) to the TM server 101 when the query agent 103 queries with regard to the trustworthiness of target device 112, along with the collected Device Parameters that query agent 103 received directly from target device 112, in their originally encrypted form. The unique Device-ID that is associated with the query, may not necessarily be the unique Device-ID that data collection agent had used to authenticate its message to the query agent 103; rather, the unique Device-ID that is associated with the query may be an arbitrary value assigned or selected by query agent 103 from a pre-defined or given name-space of fake values. The query agent 103 thus randomly or pseudo-randomly generates and assigns a pseudonymous unique Device-ID, which may be used for any number of queries on any number of target devices 112.

If the unique Device-ID 199 is anonymized as described above, then a particular target device 112 may not be able to prove its identity to the TM server 101, and/or may not be able to sign its own Device Parameters data; rather, query agent 103 may be responsible for providing and/or ensuring the integrity and authenticity of this data. Since the data coming from query agent 103 may not be associated with any real (non-fake) unique Device-ID 199 by the TM server 101, the TM server 101 may not record the data; rather, the data is utilized as part of the Trustworthiness Score(s) or report or indicators that are reported to query agent 103 in response to its query. Accordingly, query agent 103 may have no incentive to tamper with the Device Parameters that it conveys or relays.

The interaction between TM server 101 and query agent 103 may be protected or secured by using the association key between these two devices.

The system may optionally support a reset or replacement process of the unique Device-ID number or string of the target device 112, by a user of the target device 112 and/or by an entity that otherwise controls or accesses the target device 112 (e.g., manufacturer or vendor). Such reset or replacement process of the unique Device-ID may optionally be performed or triggered upon one or more pre-defined conditions or events, for example, upon change of ownership in the target device 112, or upon performing a "factory reset" of the target device 112.

The resetting or replacement of a Device-ID of target device 112, may have one or more implications on other entities in the system, for example: (a) the TM server 101 may lose continuity of information collected from the target device 112; (b) the maker or vendor of the target device 112 may lose track of the device identity, which may be relevant for other purposes (e.g., for providing services, for subscription-based services, for warranty); (c) a service provider who identifies the target device 112 based on its unique Device-ID may need to re-enroll the target device 112 upon resetting or replacement of its unique Device-ID; (d) the owner or user of the target device 112 may need to reconfigure services in order to associate them services as if a new device is introduced, i.e., the same target device 112 but having a replacement unique Device-ID. In some implementations, cryptographic key(s) of target device 112 (e.g., its private key and public key) may be replaced or re-generated, upon (or as part of) changing or replacing or resetting the unique Device-ID of target device 112.

Nevertheless, one or more considerations (e.g., possible privacy concerns by the owner or user of target device 112; change of ownership in the target device 112) may trigger a replacement or resetting of the unique Device-ID, even if such process may cause other entities to unbind from the target device 112 all information previously associated with that target device 112. Accordingly, the maker or vendor of the target device 112 may optionally determine in advance whether or not replacement of the unique Device-ID is part of a "factory reset" event of target device 112, or whether such replacement requires a separate or dedicated operation by the user of target device 112.

The system may optionally utilize a Model-ID tuple or data-set (e.g., an ordered set or group of data-items), which may be associated with each target device 112. The Model-ID tuple may comprise one or more data-items, for example: (a) a Vendor ID, indicating an the vendor (or maker) of the target device 112, as assigned by the TM server 101 to each such vendor; (b) a Model Name, which may be a vendor-defined string that is unique to a model of target device 112; (c) a Batch Name, which may be a vendor-defined string that is unique to a manufacturing batch of target device 112. For example, all models of target device 112 carrying the same Model-ID tuple may have the same stored parameters (e.g., other than parameters pertaining to software which may differ and may be updated in one or more designated fields).

Each unique Device-ID (representing a separate installation of data collection agent 102) may be associated by the TM server 101 with a Model-ID, which in turn may be linked to a larger structure of model information, which may optionally comprise the list of Device Parameters that are relevant to target devices 112 having that Model-ID.

The value of Model-ID may be fixed and static, and may be obtained by the TM server 101 from the data collection agent 102 of target device 112. The maintenance and protection of the Model-ID tuple may be the responsibility of the data collection agent 102, which may utilize one or more suitable mechanisms to ensure the integrity of the Model-ID information.

Mapping of the Model-ID to the larger set of model information may be performed by the TM server 101, for example, based on information obtained through a data submission interface, e.g., comprising data submitted directly by the maker or vendor or supplier of the target device 112, or by a service provider that utilizes or services the target device 112 and may pre-obtain such data from the vendor or maker through a service channel.

Device Parameters may be or may comprise the information or data-items that are obtained from target devices 112 by the TM server 101, and from which the Trustworthiness Scores may be derived by the TM server 101. Optionally, new definitions of Device Parameters may be dynamically introduced to the system. Device Parameters may comprise, for example, descriptive parameters and indicative parameters.

Descriptive parameters may describe the model, the capabilities and/or the components of target device 112. Descriptive parameters are generally fixed throughout the lifetime of the target device 112, unless its software stack changes, or unless its configuration changes in a manner that affects the code that the target device 112 runs (e.g., if device features are activated or deactivated). Descriptive parameters may be obtained from the vendor or maker of target device 112, or from a service provider associated with the target device 112. As long as the target device 112 uses the same software stack, its descriptive parameters are not changed (e.g., unless they are determined to be wrong).

Indicative parameters are dynamically measured by the data collection agent 102 of target device 112. Indicative parameters may have a limited lifetime, after which they may be re-measured.

Device Parameters may be stored and/or exchanged in any suitable format. In a demonstrative implementation, each Device Parameter may be stored by the TM server 101 by utilizing a pre-defined data-set or tuple, for example, "Field:Value:Time". Optionally, the Device Parameters database 121 may utilize a representation that associates a single line entry with multiple fields; other suitable storage schemes may be used. In some implementations, the tuple data structure may be utilized by target device 112 and/or by TM server 101. Optionally, TM server 101 may store data by utilizing other suitable data structure(s), for example, a database, a lookup table, an ordered list, one or more files, one or more records, or the like.

The content of the Field data-item may be globally defined by using an extensible schema for that type of target device 112, which may be a subset of a global extensible schema used by the TM server 101.

The content of the Value data-item may be, for example, a floating point or an integer or a string, according to a value type indication associated with the Value data-item in the schema. Optionally, a content of "missing" in the Value data-item may indicate that this particular Device Parameter may not be temporarily measured or determined by the data collection agent 102 of target device 112; whereas a content of "unsupported" in the Value data-item may indicate that the data collection agent 102 of target device 112 is permanently incapable of measuring or providing that particular Device Parameter.

The content of the Time data-item may be for example, the number of seconds that have elapsed since 00:00:00 Coordinated Universal Time (UTC), 1 Jan. 1970 (e.g., Epoch time, Unix time), at which the specific Device Parameter was measured or last validated by the data collection agent 102. The value of the Time data-item may be assigned by the TM server 101 according to the actual time at which the information was gathered or received by the TM server 101.

The system may utilize a pre-defined scheme for Device Parameters organization or representation, in order to avoid the need for retrieving an entire set of Device Parameters supported on a target device 112 every time that the data collection agent is queried (or autonomously initiates an update). Accordingly, selective querying for Device Parameters may be utilized. For example, Device Parameters may be grouped by subject, and thus may be organized in a tree structure by using a tree-structure message organizer 143 of data collection agent 102; and a selective (or partial) query may thus comprise one or more descending paths through that tree structure.

A node in the Device Parameters tree structure may have multiple "children" which may be determined at runtime. For example, a node called "Application Information" may have one child for each running application on the target device 112. The TM server 101 or the query agent 103 may not be interested in the details that pertain to all the applications that are installed and/or running on target device 112, but rather, only in a subset list of particular applications. Accordingly, the TM server 101 or the query agent 103 may make requests iteratively, drilling down into the details of a particular sub-tree of Device Parameters of the target device 112.

In a demonstrative implementation, paths or "branches" in a tree structure or tree-like organization may be expressed by using Extensible Markup Language (XML), or XML Path Language (XPath), or JavaScript Open Notation (JSON), or other suitable formats which may enable efficient representation and/or transport. Optionally, to save space, some strings may be replaced with pre-defined integer tags. Additionally or alternatively, in order to facilitate processing by embedded some systems, string representations may be replaced with flexible Type-Length-Value (TLV) representations. Optionally, compression and decompression of data may be used, in order to facilitate efficient storage and/or transport of Device Parameters.

The system may support communications that are initiated autonomously by an autonomous DPM transmission initiator 144 of data collection agent 102. For example, each node or branch in the tree structure of Device Parameters (e.g., each "child" node and each "parent" node), may be associated with one or more fields to facilitate such autonomous communication that is initiated by data collection agent.

A first demonstrative field may be a "Push Update" field or flag, having a Boolean value of True or False. A value of True indicates that a change in a value of a Device Parameter immediately triggers an autonomous outgoing communication by data collection agent 102.

A second demonstrative field may be an "Update Interval" field, having an integer value. For a Device Parameter that has this field set, the data collection agent may periodically measure that Device Parameter for changes, and may autonomously report the value of the Device Parameter at the indicated time interval (for example, in some implementations, regardless of whether the currently-measured value is different than a previously-measured value or is identical thereto; or, in other implementations, only if a currently-measured value is different from a previously-measured value). The value of the "Update Interval" field may indicate the time interval (e.g., in seconds, in minutes, or the like) for performing the new measurement and for autonomous reporting thereof by the data collection agent 102.

Figure 4:
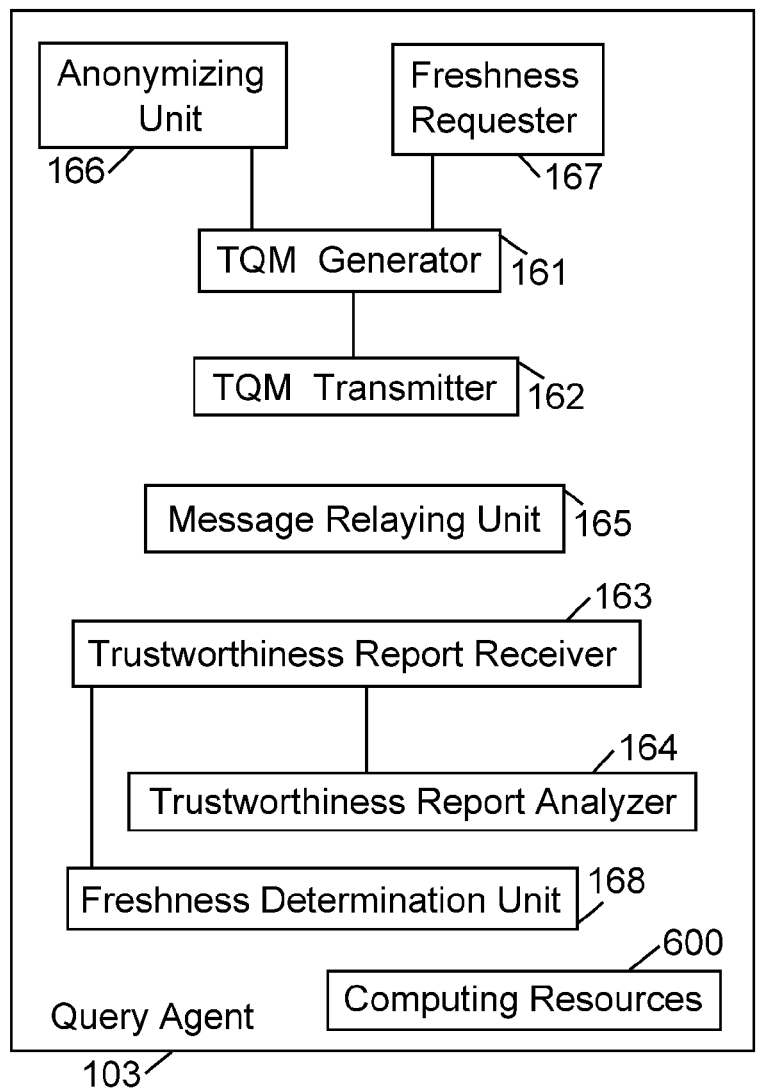
FIG. 4 is a schematic block-diagram illustration of query agent, in accordance with some demonstrative embodiments.

Reference is made to FIG. 4, which is a schematic block-diagram illustration of query agent 103, in accordance with some demonstrative embodiments. Query agent may optionally comprise one or more of the computing resources 600 of FIG. 6, and/or other suitable hardware components and/or software components. Query agent 103 may comprise, for example: a Trustworthiness Query Message (TQM) generator 161 able to generate a TQM pertaining to a particular target device 112; a TQM transmitter 162 able to send or transmit the TQM (e.g., to TM server 101); a trustworthiness report receiver 163 able to receive an incoming trustworthiness report (e.g., from TM server 101) and/or other trustworthiness score(s) or indicator(s); a trustworthiness report analyzer 164 able to process or analyze (e.g., act upon) a received trustworthiness report; a message relaying unit 165 able to relay messages (e.g., able to relay to TM server 101 a Device Parameters Message (DPM) that originated from target device 112); an anonymizing unit 166 able to anonymize the identity of a particular target device 112 to which a TQM pertains (e.g., by replacing or masking a unique Device-ID identifier); a freshness requester unit 167 able to request from caching agent(s) 104A-104C to obtain a fresh or non-cached trustworthiness report; and a freshness determination unit 168 able to autonomously determine a level of freshness of a received trustworthiness report (e.g., received from caching agent(s) 104A-104C).

Query agent 103 may run on the querying device 113 of the relying entity, namely, the entity that wishes to connect and/or communicate with target device 112 and thus requests to establish its trustworthiness by initiating a query with the TM server 101. Query agent 103 may run on any suitable computing device or other electronic device, as long as such querying device 113 is capable of communicating with the TM server 101 using one or more communication protocols that it utilizes or supports.

In order for the query agent 103 to receive responses to queries, the owner or operator of the querying device 113 that runs the query agent 103 may need to be pre-approved by or pre-enrolled with the TM server 101, which in turn may authenticate the query agent 103 by using a provisioned association key.

For the purpose of obtaining the Trustworthiness Scores of a particular target device 112, the query agent 103 of querying device 113 may generate and transmit a Trustworthiness Query Message (TQM) to the TM server 101. The TQM may comprise an identifier of the particular target device 112, for example, in the form of the unique Device-ID of the target device 112, as reported by the target device 112 or as already known to query agent 103.

If TM server 101 is not accessible to the target device 112, or if the target device 112 is not accessible to the TM server 101, then query agent 103 may send to TM server 101 the Device Parameters that originated from the data collection agent 102 of that target device 112 (e.g., which were sent directly from data collection agent 102 to querying agent 103), and may obtain from the TM server 101 the Trustworthiness Report or Scores based on this information. One or more suitable methods may be used to deliver Device Parameters from the data collection agent 102 to the TM server 101 indirectly through query agent 103, rather than directly.

In a first demonstrative example, the operator of query agent 103 of querying device 113 may wish to hide the existence and/or identity of particular target devices 112 from the TM server 101. Query agent 103 may obtain Device Parameters directly from the data collection agent(s) 102 of such target device(s), without using an association between those data collection agent(s) and the TM server 101. The Device Parameters may be encrypted using the public key of the TM server 101 (e.g., without identifying the data collection agent 102). The identity of each such target device 112 (e.g., in the form of its unique Device-ID) may be hidden or masked by query agent 103 when presented as part of a query to the TM server 101, as discussed above with reference to anonymization of the unique Device-ID In a second demonstrative example, in order to address possible networking and/or discovery constraints, query agent 103 may be used to obtain and deliver the Device Parameters from the data collection agent(s) 102 of target device(s) 112 to the TM server, such that the query agent 103 may operate as a relay element or as a store-and-forward unit. The data structures that are utilized may be similar to those used in a direct interaction between data collection agent 102 and TM server 101.

The TM server 101 may respond to the query agent 103 with a Trustworthiness Report or with one or more Trustworthiness Scores pertaining to the target device 112 that was queried about, and optionally also with indications about corrective actions pertaining to that target device 112 (e.g., depending on the capabilities of the target device 112, and/or subject to the commercial agreement between the operator of the TM server 101 and the operator of the query agent 103 installed on the querying device 113).

In order to generate or compute its response to query agent 103, the TM server 101 may optionally utilize cached information. Additionally or alternatively, the TM server 101 may query the data collection agent 102 that is running on the particular target device 112 to which the query pertains; optionally utilizing the query agent 103 as a communication relay, if the query agent 103 is able to communicate with the target device 112 and TM server 101 is not able to communicate with the target device 112. The content of messages that are exchanged indirectly through the query agent 103 between the TM server 101 and the data collection agent 102 may be encrypted; such that the query agent 103 cannot decrypt or otherwise obtain the unencrypted content of those relayed messages.

In some implementations, any data received by data collection agent 102 from query agent 103 may be untrusted by data collection agent 102. For example, in order to prevent or reduce attacks, data collection agent 102 may not trust current time information received from query agent.

The role of TM server 101 may conclude when query agent 103 of querying device 113 securely obtains or securely receives the Trustworthiness Scores and the optional Corrective Actions that pertain to the target device 112.

Figure 5:
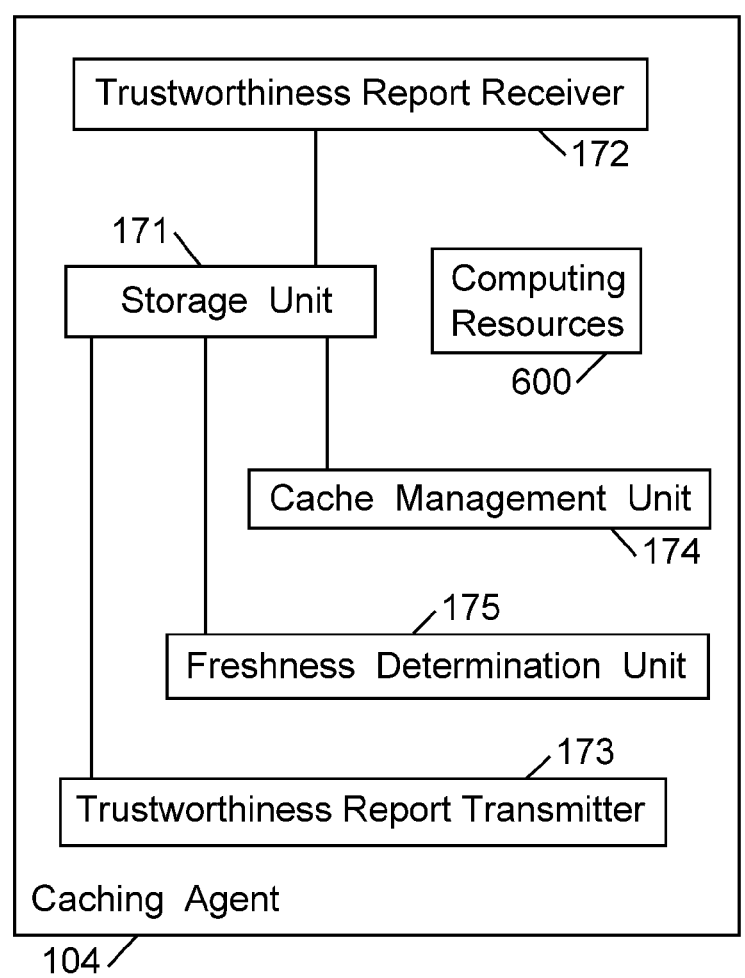
FIG. 5 is a schematic block-diagram illustration of a caching agent, in accordance with some demonstrative embodiments.

Reference is made to FIG. 5, which is a schematic block-diagram illustration of a caching agent 104, in accordance with some demonstrative embodiments. Caching agent 104 may be a demonstrative implementation of caching agent 104A and/or caching agent 104B and/or caching agent 104C mentioned above.

Caching agent 104 may comprise, for example: a storage unit 171 able to store or to cache one or more trustworthiness reports (or trustworthiness score(s) or trustworthiness indicator(s)); a trustworthiness report receiver 172 able to receive a trustworthiness report (e.g., originating from TM server 101); a trustworthiness report transmitter 173 able to transmit (e.g., to query agent 103) a trustworthiness report (e.g., a previously-cached trustworthiness report); a cache management unit 174 able to manage caching operations, able to determine a "cache hit" or "cache miss", and able to control accordingly other components of caching agent 104; and a freshness determination unit 175 able to determine a freshness rating of a trustworthiness report. Caching agent 104 may optionally comprise one or more of the computing resources 600 of FIG. 6, and/or other suitable hardware components and/or software components.

System 100 may optionally utilize a caching mechanism, as demonstrated by the optional caching agents 104A, 104B and/or 104C. Any network node that is equipped with (or associated with) such caching agent may store a copy of a Trustworthiness Score report, and may return such cached copy when queried. The caching agents 104A-104C may reduce round-trips between query Agent 103 and TM server 101, thereby reducing latency. Additionally or alternatively, caching agents 104A-104C may keep Trustworthiness Scores available in situations where the network connection with TM server 101 is lacking or intermittent or absent.

A network peer serving as a caching agent may be implemented by using a local gateway device, or as integral part of the network peer itself (e.g., as part of target device 112; or as part of querying device 113). Each such caching agent may be capable of caching a report of Trustworthiness Scores and serving it to any requester. In some implementations, such caching agent need not utilize security considerations, since only a particular query agent 103 may access the contents of a Trustworthiness Score report; as each such report is associated with one particular query agent 103 of one particular querying device 113, and each such report is destined to that particular query agent 103.

The system may optionally utilize indicators for handling or signaling freshness or relative freshness of each Trustworthiness Score report. For example, every Trustworthiness Score report that is generated by TM server 101 may comprise or may be associated with one or more time-related indicators by which its expiration or its freshness are handled or signaled.

A first demonstrative time-related indicator may be set to be equal to the earliest first-layer expiry time of the Trustworthiness Scores that are included in the report. A second demonstrative time-related indicator may be set to be equal to the latest last-layer expiry time of the Trustworthiness Scores that are included in the report. By using such time-related indicators, as well as the time at which TM server 101 issues the response, each caching agent 104A-104C may associate each response with one of multiple pre-defined levels or ratings of freshness. In a demonstrative implementation, four pre-defined freshness levels may be defined: Immediate, Fresh, Stale, and Expired.

An "Immediate" level of freshness indicates that the response has "just arrived" from the TM server 101; wherein the definition of "just arrived" may be pre-defined in each caching agent 104 in accordance with particular characteristics of the system. For example, report may be regarded as a "just arrived" report and thus as "Immediate" report, if the report has arrived from TM server 101 within the past K minutes, where K may be (for example) 10 or 15 or 30 or 45 or 60 minutes. Other suitable threshold values may be used.

An "Immediate" level of freshness may indicate that the response does not qualify as "Immediate", yet the current time is before the first time-related indicator time of the report; namely, none of the Trustworthiness Scores of that report has reached even its first layer of expiration.

A "Stale" level of freshness may indicate that the current time is between the two time-related indicators of the report; namely, there is at least one Trustworthiness Score in the report for which the first layer of expiry was reached, and yet there is at least one other Trustworthiness Score in the report for which the last layer of expiry has not yet been reached.

An "Expired" level of freshness may indicate that all the Trustworthiness Scores in the report are such that their final layer of expiry has been reached; and thus, there is no usable Trustworthiness Score in the report, deeming the report unsuitable for the purpose of establishing trustworthiness and relying thereon.

The information which may be used for determining the freshness rating of a report, may be available in the Trustworthiness Scores forming the report in conjunction with the time of the report (e.g., created or received, depending on Real Time Clock (RTC) capabilities of the caching agent 104A). Accordingly, the freshness rating may be determined autonomously, by caching agent 104 and/or by query agent 103. Optionally, caching agent 104 may determine the freshness rating of the report and may indicate the determined freshness rating to the query agent 103 when returning a response, for example, in order to alleviate query agent 103 from the need to perform this determination and/or to retain its own RTC. Query agent 103 may use the freshness rating indication provided by caching agent 104 (e.g., particularly if caching agent 104 is trusted by query agent 103); or may ignore the provided freshness rating indication, and instead may locally determine the freshness rating.

When issuing a query, the query agent 103 may optionally set an "Update-Request" flag in the query. This flag is destined to the caching agent 104, if available; and may instruct such caching agent 104 to fetch or obtain a new response from TM server 101, even if the caching agent 104 has non "Expired" response(s) (and even if it has a response having an "Immediate" freshness rating) readily stored in its cache. Upon reception of a query with the update-request flag set, caching agent 104 may actively initiate a query towards TM server 101. The response from TM server may be returned to the query agent 103, and may be cached as a new immediate response for future use, optionally replacing older responses. The response that is delivered from caching agent 104 to query agent 103 may comprise a set "Update-Done" flag, if the response is indeed a direct result of an update that was triggered by a set "Update-Request" flag in the query.

TM server 101 may ignore or disregard the "Update-Request" flag and/or the "Update-Done" flag. Optionally, each caching agent 104 may be configured to honor, or to ignore, or to selectively honor or to selectively ignore (e.g., based on one or more conditions), a set "Update-Request" flag; for example, taking into account network configuration, network congestion, system administrator policies, or other considerations or conditions. Accordingly, caching agent 104 may not set the "Update-Done" flag if the "Update-Request" is ignored, even if the response that is actually served back to query agent 103 happens to have an "Immediate" freshness rating.

The query agent 103 that utilizes cached reports may not be able to determine whether caching agent 104 is intentionally ignoring a cached report that is more "fresh" relative to the one that was actually sent back from caching agent 104 to query agent 103. For example, an attacker may gain control over one or more caching agents 104, and may serve stale reports and stale responses to query agents, e.g., while also conducting an attack on the target device 112 to which such reports pertain. This type of attack may be mitigated since even cached reports have a final expiration time, set originally by the TM server 101. In order to effectively mitigate consequences of an attack on caching agents 104, each query agent may be configured to autonomously and internally determine the freshness level of each incoming report, and/or to ignore the status of the "Update-Done" flag.

Figure 6:
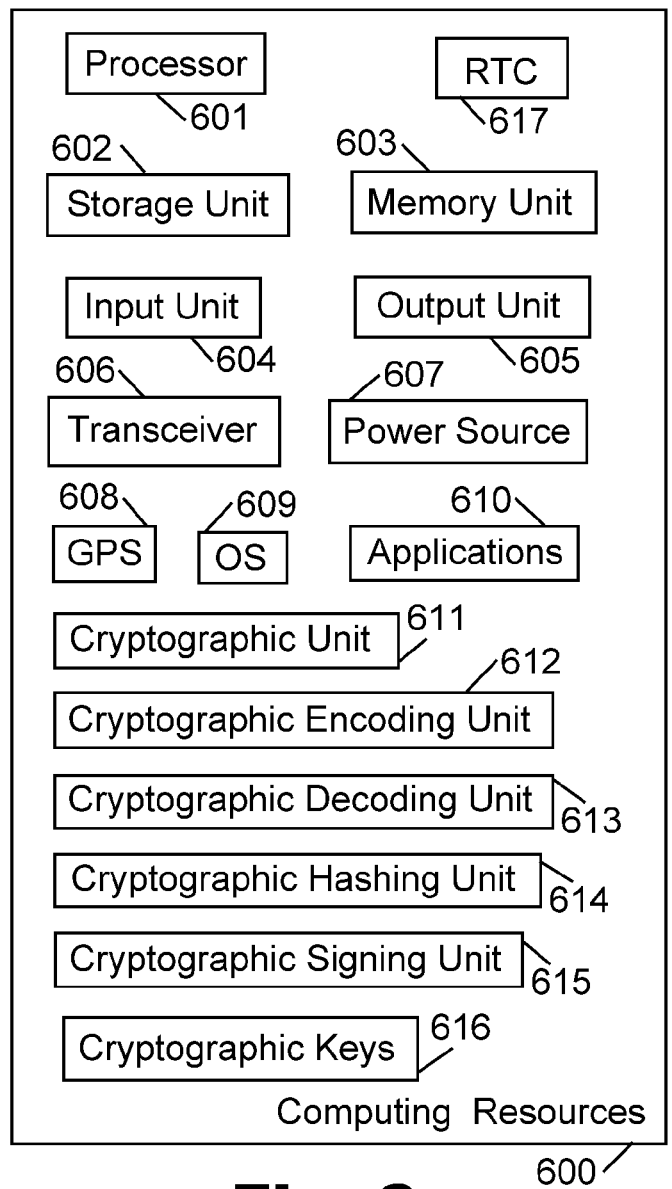
FIG. 6 is a schematic block-diagram illustration of computing resources, in accordance with some demonstrative embodiments.

Reference is made to FIG. 6, which is a schematic block-diagram illustration of computing resources 600, in accordance with some demonstrative embodiments. Some or all of computing resources 600 may be part of, or may be accessible or utilized by, or may be comprised in, or may be integrated or embedded in, or may be coupled to or associate with, any of the following devices or units: TM server 101; data collection agent 102; query agent 103; querying device 113; target device 112; caching agent 104; caching agent(s) 104A-104C.

Computing resources 600 may comprise, for example: a processor 601 able to execute code or instructions (e.g., a processor core, a single-core processor, a multiple-core processor, a Digital Signal Processor (DSP), a Central Processing Unit (CPU), a controller, a circuit, an Integrated Circuit (IC), or the like); a storage unit 602 able to store data (e.g., Hard Disk Drive (HDD), fixed drive, magnetic drive, Solid State Drive (SSD), optical drive, Flash storage or Flash memory, volatile storage, non-volatile storage, or the like); a memory unit 603 able to store data (e.g., a Read-Only Memory (ROM), an Erasable Programmable ROM (EP-ROM), a Random Access Memory (RAM), a Dynamic RAM (DRAM), firmware, or the like); an input unit 604 (e.g., a keyboard, a mouse, a touch-pad, a touch-screen, a stylus, a microphone, or the like); an output unit 605 (e.g., a screen, a touch-screen, a monitor, a display unit, a printer, an audio speaker, or the like); a transceiver 606 or other suitable wired and/or wireless communication unit (e.g., transmitter, receiver, transmitter-receiver, modem, cellular transceiver, Wi-Fi transceiver, 802.11 transceiver, Wi-Max transceiver, 802.16 transceiver, Bluetooth transceiver, Zig-Bee transceiver, 802.15.4 transceiver, one or more antennas, or the like); a power source 607 (e.g., a battery, a power cell, a rechargeable battery, a power supply unit, or the like); a Global Positioning System (GPS) unit 608 or other location-based unit or location-aware unit or geo-spatial location determination unit; an Operating System (OS) 609, optionally having a kernel and one or more device drivers or other drivers; one or more applications 610; and/or other suitable hardware components and/or software components.

Computer resources 600 may further comprise, for example: a cryptographic unit 611 able to perform one or more cryptographic operations, including (but not limited to) any of the cryptographic operations described above; a cryptographic encoding unit 612; a cryptographic decoding unit 613; a cryptographic hashing unit 614; a cryptographic signing unit 615; one or more cryptographic keys 616 (e.g., encryption keys, decryption keys, public key, private key, association key, signing key); a Real-Time Clock (RTC) 617; and/or other suitable hardware components and/or software components.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some demonstrative embodiments, a server computer may comprise: a trustworthiness query receiver to receive a trustworthiness query message, incoming from a remote querying device, with regard to trustworthiness of a remote target device; a device parameters receiver to receive a set of values that correspond to parameters of said remote target device; a trustworthiness report generator to analyze said set of parameters and to generate a trustworthiness report pertaining to said remote target device.

In some demonstrative implementations, the server computer may comprise: a trustworthiness report transmitter to transmit said trustworthiness report to said remote querying device in response to said trustworthiness query message.

In some demonstrative implementations, the server computer may comprise: a threats database to store data about known threats to electronic devices; a threat analysis unit to check, based on said parameters of said remote target device, whether or not said target device is exposed to one or more of said known threats; a trustworthiness score determination unit to determine a trustworthiness score based on said threat analysis, wherein said trustworthiness report comprises said trustworthiness score.

In some demonstrative implementations, the server computer may comprise: a threats database to store information about known threats to electronic devices; a corrective actions database to store data indicating corrective actions that correspond to at least some of said known threats; a corrective action selector to generate a corrective actions message indicating to said remote querying device, one or more corrective actions that if applied to said remote target device are expected to reduce threats to which said remote target device is exposed; wherein the corrective actions message is comprised in said trustworthiness report that is sent by said computer server to said remote querying device.

In some demonstrative implementations, the server computer may comprise: a threats database to store data about known threats to electronic devices; a threat analysis unit to check, based on said parameters of said remote target device, whether or not a first component of said target device is exposed to one or more of said known threats; and to check, based on said parameters of said remote target device, whether or not a second component of said target device is exposed to one or more of said known threats; a trustworthiness score determination unit to determine: (i) a first a trustworthiness score corresponding to a level of trustworthiness of said first component of said remote target device, and (ii) a second a trustworthiness score corresponding to a level of trustworthiness of said second component of said remote target device; wherein said trustworthiness report comprises both (I) said first trustworthiness score pertaining to said first component of said remote target device, and (II) said second trustworthiness score pertaining to said second component of said remote target device.

In some demonstrative implementations, said trustworthiness query message comprises a unique device identifier which uniquely identifies said remote target device to said computer server.

In some demonstrative implementations, said unique device identifier is a cryptographic hash value of a cryptographic key that is securely stored within said remote target device.

In some demonstrative implementations, said set of values that correspond to parameters of said remote target device, (A) are received directly at said computer server from said remote target device, and (B) are encrypted with a cryptographic association key that is shared only between (i) said remote target device, and (ii) said computer server.

In some demonstrative implementations, said cryptographic association key is known exclusively to (i) said remote target device, and (ii) said computer server, based on a prior enrollment process which enrolls said remote target device with said server computer.

In some demonstrative implementations, said set of values that correspond to parameters of said remote target device, (A) are received indirectly at said computer server from said remote querying device, and (B) are encrypted with a temporary cryptographic session key that is shared only between (i) said remote querying device, and (ii) said computer server.

In some demonstrative implementations, a copy of said temporary cryptographic session key, encrypted with the public encryption key of said computer server, is comprised within said trustworthiness query message that is received at said computer server from said remote querying device.

In some demonstrative implementations, said trustworthiness query message that is received at said computer server from said remote querying device is encrypted with a cryptographic association key that is shared only by (i) said remote querying device, and (ii) said server computer; wherein said trustworthiness report that is sent by said computer server to said remote querying device is encrypted with said cryptographic association key that is shared only by (i) said remote querying device, and (ii) said server computer.

In some demonstrative implementations, the server computer may comprise: a layer constructor unit to construct multiple layers of data in said trustworthiness report; wherein the layer constructor unit is (i) to construct in said trustworthiness report a first data-layer which indicates that for a first period of time, a trustworthiness score of said remote target device is a first score-value; and (ii) to construct in said trustworthiness report a second data-layer which indicates that for a second period of time, which is subsequent to said first period of time, the trustworthiness score of said remote target device is a second score-value which is smaller than said first score-value.

In some demonstrative implementations, the server computer may comprise: a layer constructor unit to construct multiple layers of data in said trustworthiness report; wherein the layer constructor unit is (i) to construct in said trustworthiness report a first data-layer which indicates that for a first period of time, a trustworthiness score of a particular component of said remote target device is a first score-value; and (ii) to construct in said trustworthiness report a second data-layer which indicates that for a second period of time, which is subsequent to said first period of time, the trustworthiness score of said particular component of said remote target device is a second score-value which is smaller than said first score-value.

In some demonstrative implementations, said trustworthiness report is a multi-layer multi-component trustworthiness report which comprises: with regard to a first component of said remote target device, (a) a first data-layer which indicates that for a first period of time, a trustworthiness score of said first component of said remote target device has a first score-value; and (b) a second data-layer which indicates that for a second period of time, which is subsequent to said first period of time, the trustworthiness score of said first component of said remote target device has a second score-value which is smaller than said first score-value; with regard to a second, co-located, component of said remote target device, (A) a third data-layer which indicates that for a third period of time, a trustworthiness score of said second component of said remote target device has a third score-value; and (B) a fourth data-layer which indicates that for a fourth period of time, which is subsequent to said third period of time, the trustworthiness score of said second component of said remote target device has a fourth score-value which is smaller than said third score-value.

In some demonstrative implementations, the server computer may comprise: a layer constructor unit to construct multiple layers of data in said trustworthiness report; wherein the layer constructor unit is (i) to insert into said trustworthiness report a first time-related indicator which indicates the expiration time of the earliest-expiring trustworthiness score that is comprised in said trustworthiness report pertaining to a first particular component of said remote target device; and (ii) to insert into said trustworthiness report a second time-related indicator which indicates the expiration time of the latest-expiring trustworthiness score that is comprised in said trustworthiness report pertaining to a second particular component of said remote target device.

In some demonstrative implementations, an electronic device may comprise: a data collection unit to measure values of device parameters of said electronic device; a device parameters message constructor to construct an outgoing message comprising said values of said device parameters of said electronic device; a device parameters message transmitter to transmit said outgoing message to a remote recipient device, to enable said remote recipient device to analyze said device parameters and to generate therefore a trustworthiness report indicating a level of trustworthiness of said electronic device.

In some demonstrative implementations, said outgoing message comprises a unique device identifier which uniquely identifies said electronic device to said remote recipient device.

In some demonstrative implementations, said unique device identifier is a cryptographic hash value of a cryptographic key that is securely stored within said electronic device.

In some demonstrative implementations, said data collection agent is configured to re-measure at least one of said device parameters at pre-defined time intervals.

In some demonstrative implementations, said data collection agent is configured to re-measure at least one of said device parameters upon occurrence of a triggering event.

In some demonstrative implementations, said device parameters comprise at least: (i) a non-changing descriptive parameter which fixedly characterizes said electronic device; and (ii) a dynamically-changing indicative parameter which is associated with a pre-defined lifetime value.

In some demonstrative implementations, said device parameters message constructor comprises a tree-structure message organizer to organize said device parameters in as tree-structure of data-items, which enables said remote recipient device to selectively query said electronic device with regard to values of a particular branch of said tree-structure.

In some demonstrative implementations, the electronic device comprises: an autonomous transmission initiator to autonomously initiate transmission of said outgoing message to said remote recipient device upon autonomous detection by said data collection agent unit that at least one of said device parameters changed its value.

In some demonstrative implementations, the electronic device comprises: an autonomous transmission initiator to autonomously initiate transmission of said outgoing message to said remote recipient device, if (i) said data collection agent unit autonomously detects a change of value in a particular device parameter, and (ii) if a push-update flag, that is associated with said particular device parameter, indicates that autonomous initiation of transmission is triggered by said change of value in said particular device parameter.

In some demonstrative implementations, the electronic device comprises: an autonomous transmission initiator to autonomously initiate transmission of said outgoing message to said remote recipient device at a pre-defined time interval that is indicated for at least one of said device parameters.

In some demonstrative implementations, a computerized querying device may comprise: a receiver able to receive data from a remote target device; a trustworthiness query transmitter to transmit, to a remote trust-management server, a trustworthiness query message pertaining to said remote target device; wherein said receiver is to receive, in response to said query message, an incoming trustworthiness report comprising one or more trustworthiness indicators pertaining to said remote target device.

In some demonstrative implementations, said trustworthiness query message comprises a unique device identifier which uniquely identifies said remote target device to said remote trust-management server.

In some demonstrative implementations, said unique device identifier is a cryptographic hash value of a cryptographic key that is securely stored within said remote target device.

In some demonstrative implementations, said transmitter is to further transmit to said remote trust-management server, a relayed message indicating a set of values that correspond to parameters of said remote target device.

In some demonstrative implementations, said set of values that correspond to parameters of said remote target device are encrypted with a temporary cryptographic session key that is shared only between (i) said computerized querying device, and (ii) said remote trust-management server.

In some demonstrative implementations, a copy of said temporary cryptographic session key, encrypted with the public encryption key of said remote trust-management server, is comprised within said trustworthiness query message that transmitted by said computerized querying device to said remote trust-management server.

In some demonstrative implementations, the computerized querying device comprises: an anonymizing unit to anonymize the identity of said remote target device from being known to said remote trust-management server.

In some demonstrative implementations, said anonymizing unit is to replace (a) an original unique identifier of said remote target device, with (b) a fake unique identifier that said anonymizing unit selects from a pre-defined namespace of unique identifiers.

In some demonstrative implementations, the computerized querying device comprises: a freshness requester to insert into said trustworthiness query message an indicator that a freshly-measured non-cached trustworthiness report is requested to be transmitted back to said computerized querying device in response to said trustworthiness query message.

In some demonstrative implementations, a caching unit or caching agent or caching device may comprise: a storage unit to store a copy of a trustworthiness report, that a trust-management server sent to a first querying device in response to a first trustworthiness query message that said first querying device transmitted with regard to trustworthiness of said particular target device; a trustworthiness report receiver to subsequently receive, from a second querying device, a second trustworthiness query message pertaining to trustworthiness of said particular target device; a cache management unit to detect a cache-hit, and to transmit to said second querying device said copy of said trustworthiness report in response to said second trustworthiness query message.

In some demonstrative implementations, the caching unit comprises: a freshness determination unit to determine a freshness rating pertaining to said trustworthiness report.

In some demonstrative implementations, said trustworthiness report comprises multiple layers of data; wherein a first data-layer of said trustworthiness report comprises a first time-related indicator which indicates the expiration time of the earliest-expiring trustworthiness score that is comprised in said trustworthiness report pertaining to a first particular component of said remote target device; wherein a second, different, data-layer of said trustworthiness report comprises a second time-related indicator which indicates the expiration time of the latest-expiring trustworthiness score that is comprised in said trustworthiness report pertaining to a second particular component of said remote target device.

In some demonstrative implementations, the caching unit comprises: a freshness determination unit to determine a freshness rating pertaining to said trustworthiness report, based on (i) said first time-related indicator, and (ii) said second time-related indicator.

In some demonstrative implementations, said freshness determination unit is to check at what time said trustworthiness report was received at said caching unit; and if said time is in the past K minutes, wherein K is a pre-defined positive number, then said freshness determination unit is to said trustworthiness report a first freshness rating indicating that said trustworthiness report was received by said caching unit in the past K minutes.

In some demonstrative implementations, if said time is not in the past K minutes, and a current time is before said first time-related indicator, then said freshness determination unit is to assign to said trustworthiness report a second freshness rating indicating that said trustworthiness report includes only unexpired trustworthiness indicators.

In some demonstrative implementations, if a current time is subsequent to said first time-related indicator and is prior to said second time-related indicator, then said freshness determination unit is to assign to said trustworthiness report a third freshness rating indicating that said trustworthiness report includes at least one unexpired trustworthiness indicator and also includes at least one expired trustworthiness indicator.

In some demonstrative implementations, if a current time is subsequent to said first time-related indicator, and if the current time is also subsequent to said second time-related indicator, then said freshness determination unit is to assign to said trustworthiness report a fourth freshness rating indicating that said trustworthiness report is stale and that it includes only already-expired trustworthiness indicators.

Functions, operations, components and/or features described herein with reference to one or more embodiments, may be combined with, or may be utilized in combination with, one or more other functions, operations, components and/or features described herein with reference to one or more other embodiments.

While certain features of some demonstrative embodiments have been illustrated and described herein, many modifications, substitutions, changes, and equivalents may occur to those skilled in the art. Accordingly, the claims are intended to cover all such modifications, substitutions, changes, and equivalents.

The invention claimed is:

1. A server computer comprising:
a trustworthiness query receiver to receive a trustworthiness query message, incoming from a remote querying device, with regard to trustworthiness of a remote target device;
a device parameters receiver to receive a set of values that correspond to parameters of said remote target device;
a trustworthiness report generator to analyze said set of parameters and to generate a trustworthiness report pertaining to said remote target device;
wherein said set of values that correspond to parameters of said remote target device, (A) are received directly at said computer server from said remote target device, and (B) are encrypted with a cryptographic association key that is shared only between (i) said remote target device, and (ii) said computer server;
wherein said cryptographic association key is known exclusively to (i) said remote target device, and (ii) said computer server, based on a prior enrollment process which enrolls said remote target device with said server computer.

2. A computer server comprising:
a trustworthiness query receiver to receive a trustworthiness query message, incoming from a remote querying device, with regard to trustworthiness of a remote target device;
a device parameters receiver to receive a set of values that correspond to parameters of said remote target device;
a trustworthiness report generator to analyze said set of parameters and to generate a trustworthiness report pertaining to said remote target device;
a layer constructor logic unit to construct multiple layers of data in said trustworthiness report;
wherein the layer constructor logic unit is (i) to construct in said trustworthiness report a first data-layer which indicates that for a first period of time, a trustworthiness score of said remote target device or a particular component thereof is a first score-value; and (ii) to construct in said trustworthiness report a second data-layer which indicates that for a second period of time, which is subsequent to said first period of time, the trustworthiness score of said remote target device or said particular component thereof is a second score-value which is smaller than said first score-value.

3. The computer server of claim 1,
wherein said trustworthiness report is a multi-layer multi-component trustworthiness report which comprises:
with regard to a first component of said remote target device, (a) a first data-layer which indicates that for a first period of time, a trustworthiness score of said first component of said remote target device has a first score-value; and (b) a second data-layer which indicates that for a second period of time, which is subsequent to said first period of time, the trustworthiness score of said first component of said remote target device has a second score-value which is smaller than said first score-value;
with regard to a second, co-located, component of said remote target device, (A) a third data-layer which indicates that for a third period of time, a trustworthiness score of said second component of said remote target device has a third score-value; and (B) a fourth data-layer which indicates that for a fourth period of time, which is subsequent to said third period of time, the trustworthiness score of said second component of said remote target device has a fourth score-value which is smaller than said third score-value.

4. The computer server of claim 1, comprising:
a layer constructor logic unit to construct multiple layers of data in said trustworthiness report;
wherein the layer constructor logic unit is (i) to insert into said trustworthiness report a first time-related indicator which indicates the expiration time of the earliest-expiring trustworthiness score that is comprised in said trustworthiness report pertaining to a first particular component of said remote target device; and (ii) to insert into said trustworthiness report a second time-related indicator which indicates the expiration time of the latest-expiring trustworthiness score that is comprised in said trustworthiness report pertaining to a second particular component of said remote target device.

5. The computer server of claim 1,
wherein said trustworthiness query message comprises a unique device identifier which uniquely identifies said remote target device to said computer server;
wherein said unique device identifier is a cryptographic hash value of a cryptographic key that is securely stored within said remote target device.

6. The server computer of claim 1, comprising:
a threats database to store data about known threats to electronic devices;
a threat analysis logic unit to check, based on said parameters of said remote target device, whether or not a first component of said target device is exposed to one or more of said known threats; and to check, based on said parameters of said remote target device, whether or not a second component of said target device is exposed to one or more of said known threats;
a trustworthiness score determination logic unit to determine: (i) a first a trustworthiness score corresponding to a level of trustworthiness of said first component of said remote target device, and (ii) a second a trustworthiness score corresponding to a level of trustworthiness of said second component of said remote target device;
wherein said trustworthiness report comprises both (I) said first trustworthiness score pertaining to said first component of said remote target device, and (II) said second trustworthiness score pertaining to said second component of said remote target device.

7. The computer server of claim 2, comprising:
a threats database to store information about known threats to electronic devices;
a corrective actions database to store data indicating corrective actions that correspond to at least some of said known threats;
a corrective action selector logic unit to generate a corrective actions message indicating to said remote querying device, one or more corrective actions that if applied to said remote target device are expected to reduce threats to which said remote target device is exposed;
wherein the corrective actions message is comprised in said trustworthiness report that is sent by said computer server to said remote querying device.

8. A computerized querying device comprising:
a receiver able to receive data from a remote target device;
a trustworthiness query transmitter to transmit, to a remote trust-management server, a trustworthiness query message pertaining to said remote target device;
wherein said receiver is to receive, in response to said query message, an incoming trustworthiness report comprising one or more trustworthiness indicators pertaining to said remote target device;
a freshness requester logic unit to insert into said trustworthiness query message an indicator that a freshly-measured non-cached trustworthiness report is requested to be transmitted back to said computerized querying device in response to said trustworthiness query message.

9. The computerized querying device of claim 8,
wherein said trustworthiness query message comprises a unique device identifier which uniquely identifies said remote target device to said remote trust-management server;
wherein said unique device identifier is a cryptographic hash value of a cryptographic key that is securely stored within said remote target device.

10. The computerized querying device of claim 8,
wherein said transmitter is to further transmit to said remote trust-management server, a relayed message indicating a set of values that correspond to parameters of said remote target device;
wherein said set of values that correspond to parameters of said remote target device are encrypted with a temporary cryptographic session key that is shared only between (i) said computerized querying device, and (ii) said remote trust-management server.

11. The computerized querying device of claim 10,
wherein a copy of said temporary cryptographic session key, encrypted with the public encryption key of said remote trust-management server, is comprised within said trustworthiness query message that transmitted by said computerized querying device to said remote trust-management server.

12. A computerized querying device, comprising:
a receiver to receive data from a remote target device;
a trustworthiness query transmitter to transmit, to a remote trust-management server, a trustworthiness query message pertaining to said remote target device;
wherein said receiver is to receive, in response to said query message, an incoming trustworthiness report comprising one or more trustworthiness indicators pertaining to said remote target device;
an anonymizing logic unit to anonymize the identity of said remote target device from being known to said remote trust-management server;
wherein said anonymizing logic unit is to replace (a) an original unique identifier of said remote target device, with (b) a fake unique identifier that said anonymizing logic unit selects from a pre-defined name-space of unique identifiers.

* * * * *